United States Patent
May

(10) Patent No.: US 8,229,355 B2
(45) Date of Patent: Jul. 24, 2012

(54) STORING TV-ANYTIME CRIDS IN OBJECTS

(75) Inventor: Peter Stephen May, Canterbury (GB)

(73) Assignee: TP Vision Holding B.V., Eindhoven (NL)

( * ) Notice: Subject to any disclaimer, the term of this patent is extended or adjusted under 35 U.S.C. 154(b) by 693 days.

(21) Appl. No.: 12/438,578

(22) PCT Filed: Aug. 22, 2007

(86) PCT No.: PCT/IB2007/053352

§ 371 (c)(1),
(2), (4) Date: Feb. 24, 2009

(87) PCT Pub. No.: WO2008/023337

PCT Pub. Date: Feb. 28, 2008

(65) Prior Publication Data

US 2009/0325483 A1      Dec. 31, 2009

(30) Foreign Application Priority Data

Aug. 25, 2006    (EP) .................................... 06119577

(51) Int. Cl.
*H04B 5/00*    (2006.01)
(52) U.S. Cl. ...................................... 455/41.1; 370/535
(58) Field of Classification Search .................. None
See application file for complete search history.

(56) References Cited

U.S. PATENT DOCUMENTS

| | | | |
|---|---|---|---|
| 6,773,344 B1 | 8/2004 | Gabai et al. | |
| 6,937,289 B1 | 8/2005 | Ranta et al. | |
| 2003/0052794 A1 | 3/2003 | Barile et al. | |
| 2004/0214642 A1 | 10/2004 | Beck | |
| 2005/0083865 A1 | 4/2005 | Ashley et al. | |
| 2005/0083976 A1* | 4/2005 | Ashley et al. | 370/537 |
| 2005/0238062 A1* | 10/2005 | Ashley et al. | 370/535 |

FOREIGN PATENT DOCUMENTS

| | | |
|---|---|---|
| EP | 1276067 A2 | 1/2003 |
| WO | 2004036870 A2 | 4/2004 |
| WO | 2008013356 A1 | 1/2008 |

OTHER PUBLICATIONS

The TV-Anytime Content Reference Identifier (CRIDs) http://www.tv-anytime.org.
Philips Semiconductors; Near-Field Communication, PN531—uC based Transmission module, Objective Short Form Specification, Feb. 2004, Revision 2.0.

* cited by examiner

*Primary Examiner* — Cassandra Cox
(74) *Attorney, Agent, or Firm* — Shimokaji & Assoc., PC

(57) ABSTRACT

A physical object (10) comprises a store (72) for storing at least one Content Reference Identifier (CRID) and a communications interface (71) for conveying the CRID to a receiver (20). Upon receiving the CRID, the receiver (20) can resolve the CRID to locate content for consuming (e.g. for presentation or scheduling for recording or later presentation) and can use the CRID to retrieve metadata relating to the content. Appropriate content can be selected by bringing the associated object (10) within range of the receiver (20), thus obviating the need to use a remote control or electronic programmed guide. The CRID can be pre-programmed in store (72) of object (10) or can be selected by a user by a replaceable card or input device.

25 Claims, 4 Drawing Sheets

STORING TV-ANYTIME CRIDS IN OBJECTS

This invention relates to selecting content for display on a presentation device.

Physical products, such as toys, games or other merchandising products, often relate directly to a particular television programme, film or commercial. For example, children often possess toys which represent characters from films and cartoons that they possess in their DVD collections. A person may choose to watch a television programme while playing with a particular toy. It is also known, from the range of interactive toys known as ActiMates™, developed by Microsoft Corporation, to extract control data for a toy from a video signal and to transmit the control data to the toy to cause the toy to move or speak. In each of these examples, a user is first required to select content for viewing, such as by selecting a television channel on which the relevant programme is being transmitted, or by playing a particular pre-recorded disc on which the relevant content is stored. In the case of broadcast content, this has a disadvantage of requiring a user to find at which time, and on which channel, the relevant content is due to be broadcast. In the case of pre-recorded content, this has a disadvantage of requiring a user to carry the pre-recorded content with them whenever they wish to view the content.

Some users have difficulty selecting content for viewing using conventional means. Electronic Programme Guides (EPG) are perceived by many as difficult to operate, and scheduling content for recording using manual entry of timer settings can frequently result in errors.

The present invention seeks to provide an improved way of selecting content.

Accordingly, a first aspect of the present invention provides a physical object comprising:

a store for storing at least one Content Reference Identifier (CRID);

a communications interface for conveying the CRID to a receiver.

The concept of a content reference identifier (CRID) is defined as part of TV-Anytime, which has been standardized as ETSI TS 102 822, but it has not previously been proposed to store a CRID in an object in this manner. Upon receiving the CRID, a receiver can resolve the CRID to locate content for consuming (e.g. for presentation or scheduling for recording or later presentation) and can use the CRID to retrieve metadata relating to the content. An advantage of the invention is that it allows appropriate content to be selected purely by bringing an object within range of the receiver thus obviating the need to use a conventional remote control or electronic programme guide, e.g. a child playing with a toy within range of the receiver. This provides an easier way of interacting with devices such as televisions and set-top boxes which is particularly advantageous for inexperienced users. The use of a CRID avoids the need to remember a channel number and transmission time of desired content. A user is preferably provided with content which is linked to the physical object. As an example, a soft toy representing a character in a children's television show can store a CRID identifying that show. Another example is a board game in which players are required to answer questions. The board game can store a CRID of content dedicated to that game, such as content which presents multimedia questions. The use of a CRID avoids the need to transport pre-recorded media content (e.g. DVDs) when traveling. Although the invention is particularly useful when applied to toys and younger users, it is not restricted to such applications. The CRID can be communicated between the object and the receiver via a push mechanism where the object periodically transmits the stored CRID (without any invitation from the receiver) or a pull mechanism where the receiver invites the object to transmit a stored CRID.

Further details of TV-Anytime, and content reference identifiers (CRIDs) can be found at http://www.tv-anytime.org/. The CRID references content but does not, by itself, define the storage location of the content. CRIDs can be resolved into the location of the content itself (a location which can vary over time) and can also be used to search for, and retrieve, metadata relating to the content. Furthermore, CRIDs can reference other CRIDs, enabling CRIDs to represent a group of related contents, such as a series. The metadata describes the content, such as giving details of the content (e.g. synopsis, cast listing), references to related content, reviews etc. and can be provided by alternative organizations to the content provider.

The nature of a CRID makes it particularly suitable for storing in a long-term use physical object. The CRID can be resolved to a current storage location of particular content, and can be resolved to different content (e.g. the latest episode in a series of TV programmes) over a period of time. In this way, there can be certainty that the CRID stored in an object will continue to have a useful purpose over a long period of time.

The content referenced by the CRID can include existing content (e.g. an existing series of TV programmes), content which is to be created in the future (e.g. a new feature film to be released in the future), or content which is created especially to accompany the object.

In a preferred embodiment the physical object is a toy, game or other plaything. However, the invention can be applied to a range of physical products which are capable of accommodating the electrical/electronic components to store and transmit the CRID, such as merchandising related to a television programme or feature film, product packaging, tickets or ticket stubs (cinema, airline, bus, train), books and magazines, cards (e.g. greetings cards and promotional cards), household products and beauty products. One particularly advantageous way of realizing the store and communications interface is in the form of a low-cost Radio Frequency Identification (RFID) tag which can be embedded within, or attached to, the physical object.

The content referenced by the CRID can be audio visual (AV) content, audio-only content (e.g. live radio or stored audio content such as music), video-only content etc.

Another aspect of the present invention provides a receiver comprising:

a communications interface for receiving a Content Reference Identifier (CRID) from a physical object; and, a controller arranged to cause the CRID to be resolved to a content locator or to find metadata associated with the CRID.

Another aspect of the present invention provides a method of processing CRIDs at a receiver. The functionality described here can be implemented in software, hardware or a combination of these. The invention can be implemented by means of hardware comprising several distinct elements, and by means of a suitably programmed processing platform. The functions of the receiver (and STB/PDR) can be performed by a general-purpose personal computer (PC) executing appropriate instructions. Accordingly, another aspect of the invention provides a computer program product carrying instructions for implementing the functions of the receiver, or for implementing the method. The software may be stored on an electronic memory device, hard disk, optical disk or other machine-readable storage medium. The software may be downloaded directly to the processing platform via a network connection.

Embodiments of the present invention will now be described, by way of example only, with reference to the accompanying drawings, in which.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The words "comprising" and "including" do not exclude the presence of other elements or steps than those listed in the claim.

Figure 1:
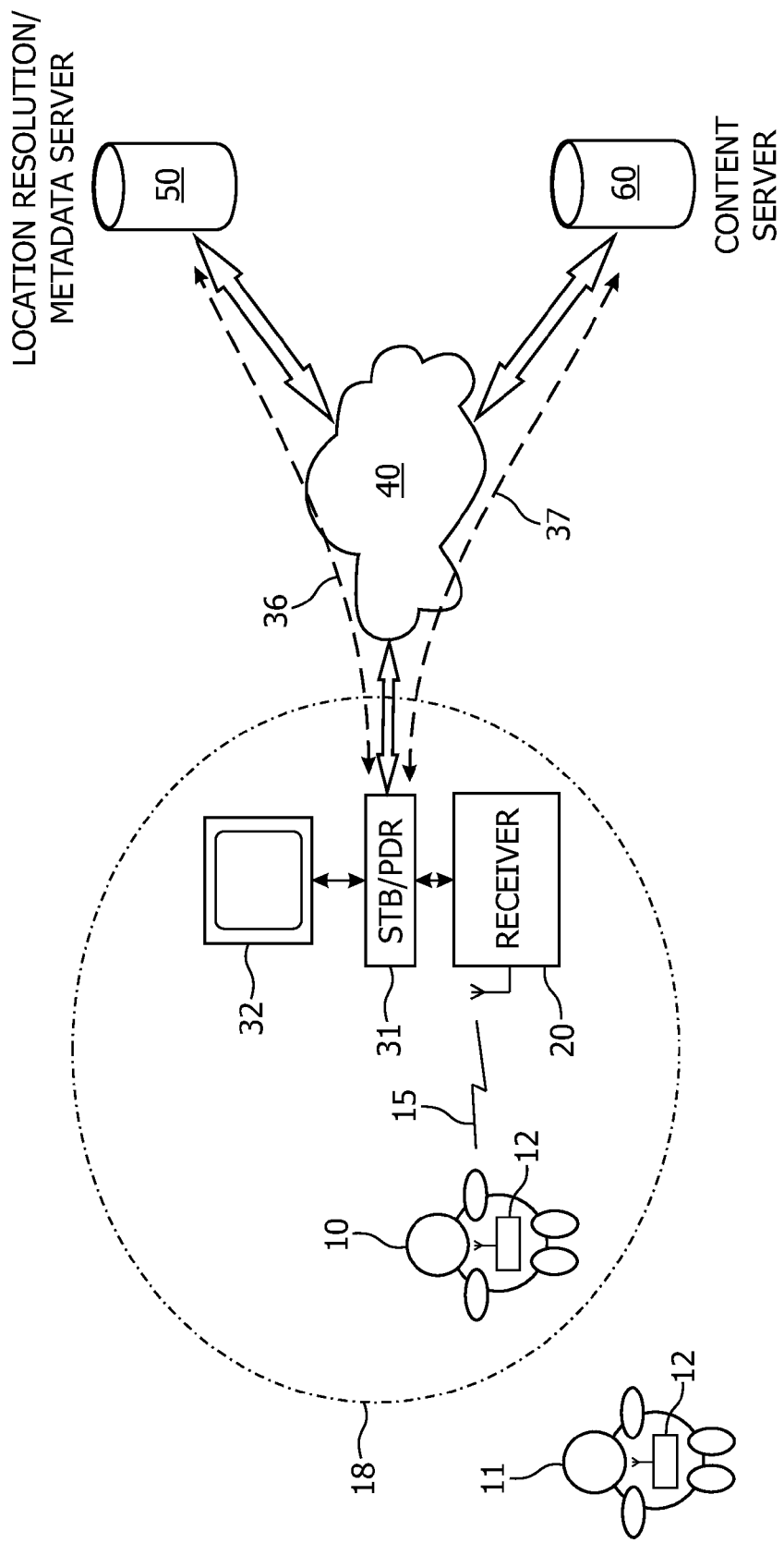
FIG. 1 shows an overall system in which the invention can be used, including an object, a receiver, a presentation device and remote servers for resolving CRIDs and supplying content.

FIG. 1 shows an overview of a system in which the invention can be used. Two objects 10, 11 each include an apparatus 12 having a store which holds a content reference identifier (CRID). The CRID identifies content which is to be associated with the object. In this example the objects are shown as toys. A receiver 20 is connected to, or integrated with, a presentation device such as a set-top box (STB) or a personal digital recorder (PDR) 31 and a television set/general purpose display 32. Modules within the receiver 20 and the apparatus 12 support a communications interface 15 between the object 10 and receiver 20 which allows the CRID stored at object 10 to be sent to the receiver 20. The CRID can be 'pushed' from the object 10 to the receiver 20 or alternatively any object within range 18 of the receiver 20 can be invited by the receiver to transmit a CRID in a 'pull' manner.

Upon receiving a CRID, the receiver 20 can attempt to resolve the CRID to one or more 'locators' where content corresponding to the CRID can be obtained. Content can then be obtained from the location identified by the locator. The receiver 20 can also attempt to use the CRID to obtain metadata describing the content. The content may be a piece of Content on Demand (CoD) or broadcast content. For Content on Demand, the locator can identify a server where the content can be obtained from. Consuming rights (subscription, allowed age rating, etc.) and purchasing information (if applicable) can be stored as part of the metadata. For broadcast content, the locator indicates the broadcast channel and broadcast time information where the content can be obtained. The broadcast content can be free-to-air or pay-per-view. If one of the locators indicates that the content associated with the CRID is currently being broadcast, the receiver 20 can cause the content to start playing via STB 31 and display 32. If the content is due to be broadcast at a future time, the PDR 31 can be set to record the content. Alternatively, a notification can be set to alert the user when the content is available for viewing. The actions taken by the receiver 20 can be based on user preferences set in the receiver 20.

A further alternative is that if the CRID cannot be resolved (e.g. there is currently no scheduled broadcast time for this CRID), or if the resolved locators indicate the required content cannot be obtained (e.g. the content is not due to be broadcast within the next hour), the metadata associated with the CRID can be retrieved and used to generate a query for other content (e.g. other content of the same genre which is due to be broadcast in the next hour.) The alternative content can be chosen based on the parental guidance rating, or the same or similar key words in the title.

Figure 2:
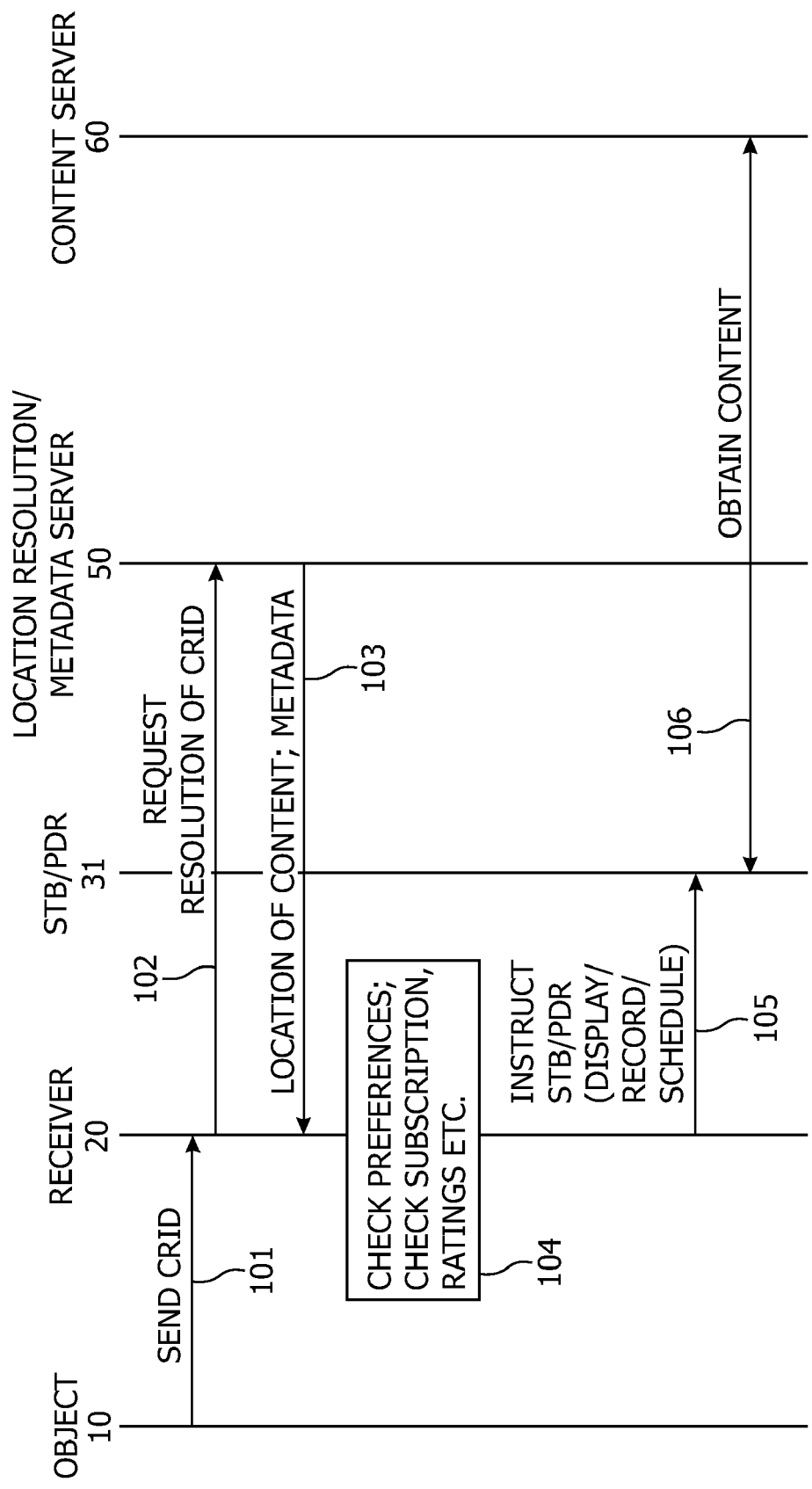
FIG. 2 shows operation of the system of FIG. 1.

A typical sequence of events to select some content will now be described with reference to FIG. 2.
1. Object 10 is brought into range of the CRID receiver 20.
2. CRID is transmitted from the object 10 to the receiver 20 and received by the receiver 20 (step 101).
3. The receiver forwards the CRID to a TV-Anytime enabled device (within receiver 20, or within a device connected to the receiver 20).
4. The CRID is resolved using the Location resolution Server 50 and the locator(s) of the content are returned (steps 102, 103). Optionally, metadata corresponding to the CRID is also retrieved.
5. (Optional) Any user preferences are checked and appropriate rights are checked, e.g. age rating, payment subscriptions etc. (step 104) using the retrieved metadata.
6. The receiver issues appropriate instructions to present, record or schedule some future presentation of the content (step 105) using one of the locators obtained at step 4.
7. The content is streamed to the user's STB/PDR 31 from the AV Content Server 60 for consuming (step 106), which may also include requesting the content from a Content on Demand (CoD) server 60.

Playback of the content (e.g. play, pause, stop) can be controlled via a conventional remote control with the object 10 acting only as a mechanism to choose which content is selected for presentation. Alternatively, remote control facilities can be embedded into the object 10, allowing both content selection and playback control via the object 10. Once content has been selected, the object 10 does not have to remain within the receiving range of receiver 20 to continue viewing the selected content.

The process of resolving the CRID into a content locator uses CRID resolution signaling 36. The subsequent delivery of the content to the presentation device 31 uses a delivery channel 37. The CRID resolution signaling 36 and delivery channel 37 can use the same network (e.g. a connection to the Internet 40) or different network connections. The CRID resolution signaling can use a dial-up, broadband or wireless connection to access a location resolution/metadata server 50 (e.g. via the Internet), while the delivery channel can be any broadcast or delivery-on-demand distribution mechanism, such as a terrestrial or satellite delivery channel or an IP-based delivery mechanism. The network connections can be wired or wireless. The CRID resolution can also be performed entirely by the receiver 20 or STB 31, using locally stored data, without the need for a signaling exchange 36 with an external metadata server 50. In this case, the appropriate CRID resolution data will need to be sent to the receiver 20 via the AV stream to allow the receiver to resolve the CRIDs. This may impose a limitation as it is likely only information relevant to all STBs will be transmitted (e.g. relating to content for the next 8 days).

Figure 3:
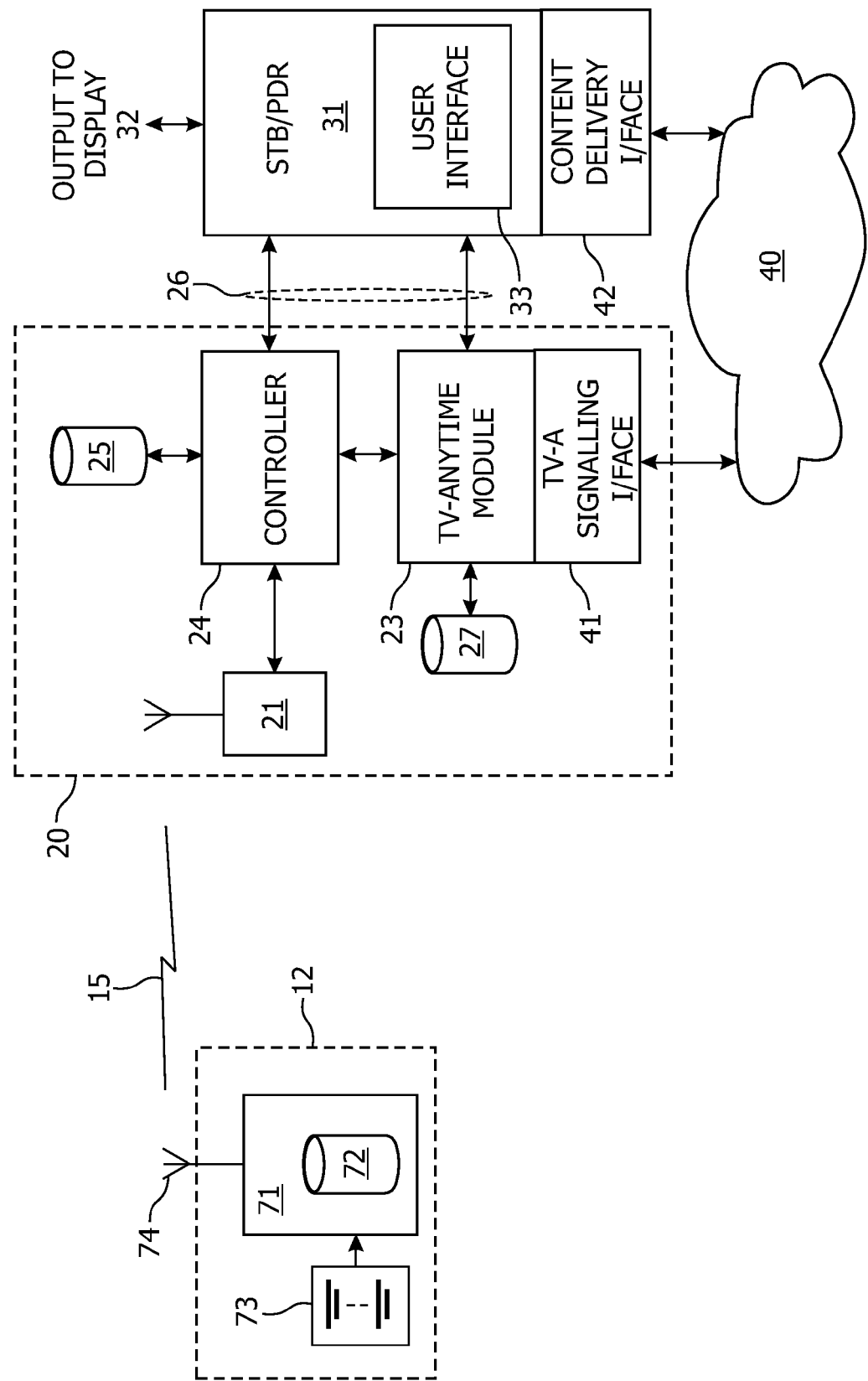
FIG. 3 shows a first embodiment of apparatus used within the system of FIG. 1 in more detail; and, FIGS. 4 and 5 show further embodiments of apparatus used within the system of FIG. 1.

FIG. 3 shows apparatus 12 within toy 10, and the receiver 20, in more detail. A communication module (transmitter) 71 includes a store 72 which stores a single CRID, or multiple CRIDs. The store can comprise a solid state memory or any suitable non-volatile storage device capable of storing the CRID. The store 72 can also store other useful information such as a user ID and/or product ID, although this is optional. The communication module comprises the necessary components to support a communication interface with receiver 20. Transmitter 71 includes an aerial 74. The transmitter can be a one-way transmitter which can periodically transmit a signal which specifies the CRID to receiver 20, although preferably it is a transmitter which transmits the CRID only in response to receiving an interrogatory signal from the receiver 20. A power supply 73, such as a battery, powers the transmitter 71. The power supply 73 is optional as certain technologies, e.g. passive RFID tags, passive variants of Near Field Communication (NFC) do not require a local power supply. Variants of NFC can signal information by modulating the interrogatory signal or can obtain power from a signal transmitted by the interrogating receiver 20.

The communication interface can be based on any suitable wireless technology, such as sound, light (e.g. infrared) or radio (e.g. a personal area network technology like Bluetooth, IEEE 802.15.1). A preferred technology for the transmitter 71 is Near Field Communication (NFC) or passive RFID technology. These are wireless, short-range, communication technologies in which a tag mounted within/on an object is interrogated by an external reading device (receiver 20). A suitable NFC device for use as transmitter 71 and communications module 21 is module PN511 or PN531 supplied by Philips Semiconductors and described in "Near Field Communication, PN531-μC based Transmission module, Objective Short Form Specification, February 2004, Revision 2.0".

A receiver 20 can be integrated within another device, such as a set-top box or PDR 31 or a television set 32, or it can be supplied as an add-on unit. Receiver 20 comprises a communications module 21 which is used to receive the CRID(s) from the object(s) 10, 11. Preferably, the communications module 21 is arranged to transmit a request, inviting any objects 10, 11 that are within range of module 21 to reply with the CRID that they store. Alternatively, the receiver 20 periodically listens for any CRIDs transmitted by objects 10, 11. A controller 24 contains the control logic to support interaction with the objects 10, 11 and to determine what actions should be taken upon receiving a CRID from an object, e.g. cause content to be presented on main TV, record content to PDR, notify user, etc. User settings are stored in a memory 25 which is accessed by the controller 24.

A TV-Anytime module 23 supports the logic necessary to process TV-Anytime CRIDs. This controls the resolving of CRIDs, obtaining metadata and locations of content. Where the receiver 20 is integrated with a TV-Anytime equipped device such as a STB or PDR 31, then a single TV-Anytime module 23 can be shared by the receiver 20 and the STB/PDR 31 and hosted by either the receiver 20 (as shown in FIG. 3) or the STB/PDR 31. In FIG. 3 the TV-Anytime module 23 includes a signaling interface 41 which can be bi-directional (i.e. send and receive) or uni-directional (i.e. receive only). The manner in which CRIDs are processed is dependent on whether interface 41 is uni-directional or bi-directional. Where the TV-Anytime module 23 is hosted by the STB/PDR, an interface 26 can also be used to communicate with the TV-Anytime module within STB/PDR 31 to resolve CRIDs and obtain metadata.

Whether the receiver 20 is integrated with a STB/PDR, or separate from the STB/PDR, an interface 26 is provided between the receiver 20 and STB/PDR 31 to allow the receiver 20 to issue instructions for the selection and presentation of content, or to schedule future presentation or recording of content. These instructions can take the form of, for example: select channel 21; schedule recording of channel 44 at 19.30 hrs; use the locator to retrieve content, e.g. play content from locator, record content from locator, remind about content from locator. There is a range of actions that the receiver 20 can take upon resolving a CRID. Some possible behaviors for a receiver include:

- play content (broadcast or CoD) corresponding to the CRID. The receiver 20 instructs the STB to select a channel which is showing the required content (resolved from the CRID) and to begin playback to the viewer.
- follow a user pre-defined action. The user could set up a standard response for all content resolved from CRIDs received from objects, e.g. play content on main TV 32, or a specific response for each CRID.
- set a reminder or schedule a recording of the content. STB 31 is instructed to set a notification to remind the user when the associated content becomes available for viewing.
- Search for related content. The receiver 20 can search for alternate content (should the desired content not be available) using tools such as: a recommendation provider, or TV-Anytime query based on metadata attributes for the CRID, e.g. find all cartoons broadcast in the next hour, or find content with "dinosaur" in the title or synopsis.
- Where the CRID resolves to a "series" of episodes (either for the same programme or for a mixture of different programs, e.g. cartoons related to the same toy manufacturer), the receiver 20 can select (a) the most relevant, (b) the next episode to be transmitted (c) present the user with available episodes and wait for the user to select one of the episodes.

Note that some of the above options may require receiver 20 to use bi-directional CRID resolution signaling 36.

Controller 24 includes a 'lock' mechanism which prevents the receiver 20 from changing the content currently being consumed. A notification could be displayed on the screen to notify the user that this action (i.e. toy CRID activation) is not permitted at present. If a lock is activated, steps 3-7 of the procedure described above do not occur.

Where the receiver 20 and STB/PDR 31 are integrated, a user interface 33 of the STB/PDR can be used to set user preferences and for handling any other user inputs required by the receiver 20 and settings or prompts can be displayed using the output from the STB/PDR 31 to display 32. If the receiver is a separate unit, then a dedicated user interface can be provided on the receiver 20 or interface 26 between the receiver 20 and STB/PDR 31 allows the existing user interface 33 to be used.

In FIG. 3, the STB and PDR is shown as a single unit 31 although these can be separate units. The receiver 20 can interface with other media presentation/rendering devices.

As described above, a TV-Anytime module 23 within the receiver 20, or a host device, connects to a network for the purpose of resolving CRIDs. The process of resolving CRIDs to actual content is described in ETSI TS 102 822-4 [Broadcast and On-line Services: Search, select, and rightful use of content on personal storage systems ("TV-Anytime"); Part 4: Content referencing] to which the skilled reader is directed for further information. The process of resolving CRIDs translates the CRID to either (i) another CRID, which itself can be resolved to other CRIDs or (ii) locators. Locators define the content in terms of time (e.g. broadcast time) and space (e.g. delivery channel). CRIDs referencing other CRIDs allow a 'series CRID' referring to many episodes of content. Resolution can occur on either the client side (receiver 20 has an interface 41 comprising uni-directional signaling) or the server side (e.g. by a server 50 when the receiver 20 has an interface 41 comprising bi-directional signaling).

In a receiver 20 which has a uni-directional interface 41 all information required by the TV-Anytime module 23 to resolve the CRID and retrieve metadata is required to be transmitted alongside the AV content. The amount of information that can be transmitted is limited by the bandwidth available. TV-Anytime data can be sent cyclically to the module 23 throughout the duration of when it is needed, as it is not known if a STB device is connected and has received all the information. Resolving Authority Records (RAR) are broadcast to the client. These provide information needed for retrieving the location resolution data. A resolution handler is chosen depending on the protocol used to transmit the location resolution information (e.g. a DVB resolution handler for location resolution information sent on a DVB transport stream). The location resolution information will identify the locators (or list of CRIDs) corresponding to particular CRIDs. In an embodiment of the invention where the TV-Anytime module 23 has a uni-directional (receive only) signaling interface 41, the receiver 20 is likely to have a reduced amount of metadata to resolve CRIDs. Some techniques for coping with this are:

Resolve CRIDs to the closest match, based on the data available to module 23. The matching process can use techniques such as recommending content based on a CRID, e.g. matching by genre, title/synopsis searches, etc.

Store received CRIDs at the receiver/STB until they can be resolved. The receiver can use a time limit for the length of time each CRID is stored to prevent the receiver from storing an excessive number of CRIDs.

User can control which CRIDs are stored at the receiver 20 for resolution.

A "blacklist" of CRIDs that should be ignored and not resolved. This list could be automatically generated or user-defined.

Apparatus 12 within an object 10 can store multiple CRIDs (e.g. a set of N CRIDs). The apparatus 12 can include control logic which determines which CRID, or sub-set of the CRIDs (e.g. a sub-set M of the total set of N CRIDs, where M<N), is sent to receiver 20. Alternatively, the apparatus 12 can send the entire set of stored CRIDs to the receiver 20 and the receiver can include control logic which determines how the multiple CRIDs are handled.

In the case where the object includes logic for selecting a CRID, the selection can be entirely random or can be based on a parameter such as time or other inputs received by the object. As an example, the control logic within apparatus 12 can include a clock (either actual date/time or elapsed time from an event such as the time of manufacture) and the control logic can select a CRID from the multiple stored CRIDs based on the current date or time or current value of elapsed time. Each of the stored CRIDs can be associated with a particular range of dates or times or a range of elapsed times. Alternatively, the object can include one or more sensors which respond to, for example, physical pressure, temperature, light, sound and selects one of the stored CRIDs based on inputs via these sensors.

In the case where the receiver includes control logic for selecting one of the received CRIDs, the control logic can be provided as part of, or referenced by, metadata associated with the CRID. An advantage of making the selection at the receiver/server side is that the logic can be updated subsequent to the product being manufactured. The control logic can be included in, or referenced by, metadata associated with a CRID. Alternatively, the control logic can be obtained from a server, independently of the metadata. An ordering can be specified for the CRIDs stored at the object 10. This ordering can be used by the receiver 20 in deciding how to resolve the CRID. If the content identified by the first CRID is unavailable (e.g. content is not being broadcast until later; content has not yet been created) then the remaining CRIDs can be resolved in order until an available content is found. Alternative strategies for processing multiple CRIDs from an object are:

resolve the CRIDs based on the order that the CRIDs are received;

randomly select a CRID from those received and resolve that one;

resolve all CRIDs and automatically select the content with the closest availability;

obtain metadata for all CRIDs and allow the viewer to select the most appropriate;

select a CRID on the basis of a user's selection preference from previous viewings;

select one of the CRIDs based on an object ID or user ID stored at the object 10.

Alternatively, a "Main" CRID could be supplied which resolves to a content selection screen. The user can select some content to consume from this menu. The main CRID can refer to an interactive piece of content (an application) that allows the user to select alternative content. Alternatively, TV-Anytime Phase 2 'packages' can be used.

Where multiple objects 10, 11 each have a CRID stored within them, and the multiple objects are brought within range of the receiver 20, multiple CRIDs can be received at receiver 20. The receiver 20 includes control logic to process the multiple CRIDs. Some options for operation of this control logic are:

resolve each of the received CRIDs (i.e. obtain metadata for each of the CRIDs), present the metadata to the user as a menu of possible options and allow the user to select the most appropriate;

ask the user to remove all objects from the receiving region of receiver 20 until only the desired object remains. This can be achieved by periodically polling objects within the reception region to detect when an object leaves;

automated ordering of available content (in a similar manner to that described above for processing multiple CRIDs from a single object). This can include: resolving multiple CRIDs and ordering according to availability of content, ordering based on parental guidance ratings (e.g. ratings for adult age group takes precedence over ratings for younger age group after 9 pm), ordering according to user preferences.

resolve CRIDs according to the order in which each object's CRID is received at receiver 20. Content (or metadata describing the content) is presented to a user for each resolved CRID in turn, with the user being given the option to view that content or to skip to the next content/metadata for the next CRID.

A further option is to use the combination of detected CRIDs in a positive manner. Certain content can be accessed only when a particular combination of objects (each bearing a particular CRID) is present within the receiving range of receiver 20. This can provide an incentive for a user to acquire a set of objects (e.g. toys in a range, cards in a set). The appropriate logic can be implemented using TV-Anytime Phase 2 'coupons'. Alternatively, the appropriate logic can be downloaded to the receiver from a server or from one of the objects.

The use of CRIDs to identify required content, rather than the exact location, allows the content to be obtained from any suitable location. The location is resolved at the time the content is required. The same CRID can reference different versions of the same content (e.g. different time showings, or different formats). The CRID can be embedded in an object before content is actually created. The resolving process will locate the content for consuming when it becomes available.

This is useful for embedding CRIDs that reference a future series before it has been made, for example. The latest episode, or another episode, in a series can be searched for and selected for consuming through a single CRID. A CRID can reference other CRIDs, enabling references to groups of content such as a series. An embedded CRID could reference a series relating to the toy.

Instance Metadata Ids (IMIs) can be used to distinguish between different instances of the same identifier during the resolving process. These remain constant for particular instances. If the CRID is resolved again at a later stage, the IMI can be used to retrieve the same desired content even if the locator subsequently changes.

Metadata associated with a CRID can provide (regional) age restrictions for content, and so restrict what content is viewed when an object is brought within range of receiver 20. Users (e.g. parents of a child) can set appropriate restrictions as part of the preferences stored 25 at the receiver 20. When a CRID is sent by an object 10 to the receiver, the receiver retrieves metadata corresponding to the CRID. The metadata will specify that the content is only appropriate for a certain age (e.g. above the age of 13 years.) If the user preferences state that the user should not view content of this age range, the receiver can prevent presentation of content, with the possibility of giving the user the option of entering a personal identification number (PIN) to override the stored preferences and proceed to present the content.

The provision of CRIDs from an object owned by a user has some further advantages and possibilities. Advertising content relating to the object can be referenced via the CRID stored at the object or can even be actively targeted to the user. TV-Anytime provides a 'submit' method to submit information to a content provider. This could be used to send CRIDs retrieved from owned objects to a recommendation provider who could analyze the information (possibly in relation to other consumers) and return content (CRIDs) that might be of interest to the consumer. A possible enhancement could be to allow the device to keep track of CRIDs it has received from toys, and use these to receive advertisements or recommendations. Metadata associated with the CRID, and retrieved by the receiver 20, can include a direct link to products available for purchase online (e.g. other toys in a range of toys). Alternatively, the metadata associated with the CRID could be used to search for items in an online store.

As described above, the invention can be applied to a range of physical objects which are capable of accommodating the electrical/electronic components to store and transmit the CRID, such as merchandising related to a television programme or feature film, product packaging, tickets or ticket stubs (cinema, airline, bus, train), books and magazines, cards (e.g. greetings cards and promotional cards), household or beauty products (e.g. hairbrush). The object can be a passive item with no other electrical/electronic components (e.g. a soft toy, product packaging, ticket, card) or it can be an electrical/electronic item (e.g. interactive toy or game). Where the object is an electrical item, the sending of the stored CRID from the object by apparatus 12 can trigger the operation of other electrical/electronic components. As an example, an interactive toy associated with a particular television programme can transmit a CRID corresponding to that programme. Receiver 20 resolves the CRID and selects the television programme for presentation. The television programme includes control instructions to control the interactive toy which are transmitted from the STB to the toy. A receiver in the interactive toy receives the control instructions and operates features of the toy in the manner described, for example, in U.S. Pat. No. 6,937,289.

Figure 4:
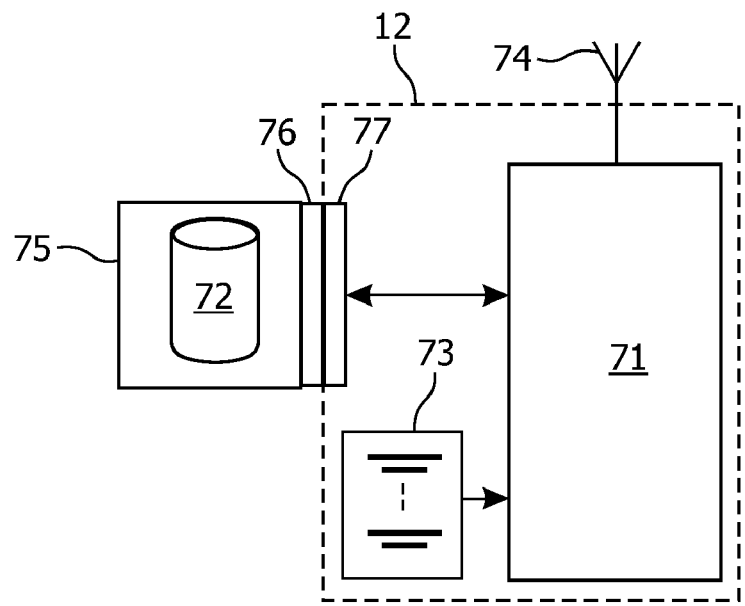
Figure 5:
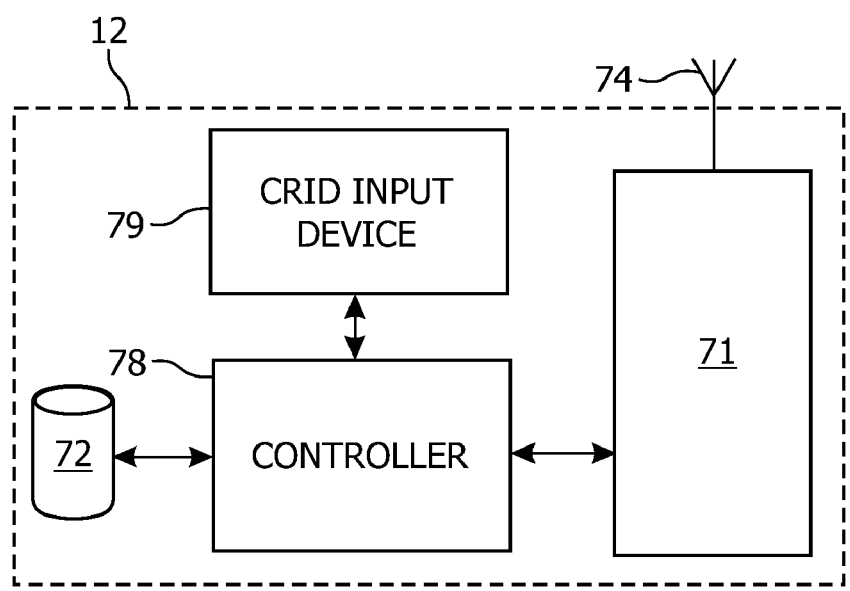

The apparatus shown in FIG. 3 assumes that a CRID is pre-programmed into a store 72 of an object 10, for example, at the time of manufacture, and that it is not possible for a user to change the CRID during the lifetime of the object. The nature of the CRID (references content, not a temporal location of the content) make it particularly suitable for long-term embedding in this way. FIGS. 4 and 5 show some alternative embodiments of apparatus 12 at an object which allow a CRID to be changed by a user. FIG. 4 shows apparatus 12 in which the CRID is stored 72 on a card 75 which is removably fitted to the apparatus. Transmitter 71 is joined to a connector 77 for connecting to a complementary connector 76 of a card 75. The card 75 can take the form of a conventional memory card. The cards 75 can each carry one CRID or a selection of CRIDs which are selected between based on selection logic in the transmitter 71 or store 72 on the card, or by selection logic stored at receiver 20. The CRIDs can be pre-programmed with a respective CRID, with the user selecting an appropriate card for the content they require. Alternatively, the card can be programmed with a required CRID using an external programming apparatus (e.g. a PC) or the apparatus 12 can include an interface which allows an external device to program a CRID in the store within the apparatus 12. As an example of how this embodiment would be used, consider a toy in the form of an action figure having various costumes representing different guises of the figure (e.g. secret agent, businessman, sportsman.) Each costume can include a different card 75 which stores a CRID of content associated with that guise.

In FIG. 5, the apparatus 12 within an object includes a controller 78 and a CRID input device 79. The CRID input device 79 can take the form of a keypad entry, or a bar code or optical character recognition (OCR) reader which allows a user to scan a printed CRID. Alternatively, the CRID input device 79 can take the form of a communication link with a communications network capable of distributing CRIDs.

In FIGS. 4 and 5 object 10 which hosts apparatus 12 can take the form of a mobile communications device such as a mobile phone, a personal digital assistant (PDA) or a portable computer. Alternatively, object 10 which hosts apparatus 12 can take the form of a remote control for the STB/PDR 31. The remote control can include standard circuitry for receiving inputs from a user, converting the inputs to control codes and for sending the code via a wireless signal (typically infra-red) to a receiver. The transmission of a CRID from apparatus 12 preferably uses the same set of control codes, and infra-red signaling, as the remote control to minimize the amount of additional circuitry required at the apparatus 12 and receiver 20 to support the transmission of CRIDs. In this way, a user is able to select content without the need to use an Electronic Programme Guide (EPG) to find when content is due to be broadcast. If a user wishes to record content, this can be achieved without the need to use an EPG, or to locate when the content is due to be broadcast and then to input a channel number and start and stop times.

The above description describes how a CRID, or multiple CRIDs, can be stored at an object. The store 72 can additionally store a User ID and/or a Product ID or Object ID. The Product ID typically would be pre-programmed during manufacture and identifies the product (either identifying the product type, e.g. soft toy from manufacturer ABC, model XYZ, or uniquely identifying the object in the manner of a serial number). The Product ID can be used to tailor the content referenced by the CRID. The Product ID can identify what other products are needed to obtain additional content (e.g. you have object x, you just need objects y and z.) The Product ID can also be used to locate an object on a manufacturer's website.

The User ID is particular to a user of the object. Preferably, this requires a bi-directional communications interface 15 with the object 10 which allows a user to store/change a User ID on the object. An object can store multiple User IDs, and each User ID can be associated with a set of CRIDs. The User ID can be used as part of a parental control mechanism, to restrict when certain users' objects are permitted to select content. The User IDs can also be used to form a hierarchy of users, which can be used to determine which object takes priority when multiple objects are brought within range of receiver 20. The User ID can also be used to determine who is allowed to purchase content, or to establish a credit limit for a particular user. An individual profile can be created for each family member based on the objects which have the same User ID.

In the description above, and with reference to the Figures, there is described a physical object 10 which comprises a store 72 for storing at least one Content Reference Identifier (CRID) and a communications interface 71 for conveying the CRID to a receiver 20. Upon receiving the CRID, the receiver 20 can resolve the CRID to locate content for consuming (e.g. for presentation or scheduling for recording or later presentation) and can use the CRID to retrieve metadata relating to the content. Appropriate content can be selected by bringing the associated object 10 within range of the receiver 20, thus obviating the need to use a remote control or electronic programme guide. The CRID can be pre-programmed in store 72 of object 10 or can be selected by a user by a replaceable card or input device.

The invention claimed is:

1. A physical object comprising:
a store for storing at least one Content Reference Identifier (CRID); and
a wireless communications interface for conveying the at least one CRID to a receiver, said communications interface comprising a Near Field Communications (NFC) interface.

2. A physical object comprising:
a store for storing at least one Content Reference Identifier (CRID); and
a communications interface for conveying the at least one CRID to a receiver, said communications interface being operative to detect an invitation to transmit from the receiver and to transmit the stored CRID in response to receiving the invitation.

3. A physical object comprising:
a store for storing at least one Content Reference Identifier (CRID); and
a communications interface for conveying the at least one CRID to a receiver, said communications interface being operative to periodically transmit the stored CRID.

4. A physical object comprising:
a store for storing a plurality of Content Reference Identifiers (CRIDs); and
a communications interface for conveying the at least one CRID to a receiver, said physical object comprising control logic operative to select at least one of the CRIDs for conveying to the receiver.

5. A physical object according to claim 4 where the at least one CRID selected by the control logic relates to operation of said physical object.

6. A physical object comprising:
a store for storing at least one Content Reference Identifier (CRID);
a communications interface for conveying the at least one CRID to a receiver; and
an input device for receiving at least one CRID for storage in the store.

7. A physical object according to claim 6 where said store is operative to store at least one of:
an identifier of the physical object; and
an identifier of the owner of the physical object.

8. A physical object according to claim 6 comprising one of: a toy, game, product packaging, ticket, book, magazine, promotional/greetings card, household object, beauty product.

9. A receiver comprising:
a communications interface for receiving a Content Reference Identifier (CRID) from a physical object; and,
a controller operative to cause the CRID to be resolved to a content locator or to find metadata associated with the CRID;
said controller being operative to schedule a reminder to be displayed when content corresponding to the resolved CRID is available.

10. A receiver according to claim 9 where the controller is operable to cause content corresponding to the resolved CRID to be presented on a presentation device local to the receiver.

11. A receiver according to claim 9 where the controller is operative to schedule a recording of content corresponding to the resolved CRID on a recording device.

12. A receiver according to claim 9 where the controller is operative to access a store of user preferences to determine what action the receiver takes upon resolving a CRID.

13. A receiver comprising:
a communications interface for receiving a Content Reference Identifier (CRID) from a physical object; and
a controller operative to cause the CRID to be resolved to a content locator or to find metadata associated with the CRID;
said controller being operative to review the received metadata to determine what action that the receiver should take after resolving a CRID.

14. A receiver comprising:
a communications interface for receiving a Content Reference Identifier (CRID) from a physical object; and
a controller operable to cause the CRID to be resolved to a content locator or to find metadata associated with the CRID;
said controller being operative to process a plurality of CRIDs received from at least one physical object.

15. A receiver according to claim 14 comprising an interface for communicating with a TV-Anytime module hosted by another device local to the receiver.

16. A receiver according to claim 14 further comprising an interface for communicating with a presentation device local to the receiver.

17. A receiver comprising:
a communications interface for receiving a Content Reference Identifier (CRID) from a physical object; and
a controller operable to cause the CRID to be resolved to a content locator or to find metadata associated with the CRID;
said controller being operable to process a plurality of CRIDs received from different physical objects.

18. A receiver according to claim 17 where the controller makes the content of certain CRIDs received from the physical objects is made accessible only when a predetermined combination of said physical objects is within receiving range of said receiver.

19. A receiver comprising:
- a communications interface for receiving a Content Reference Identifier (CRID) from a physical object; and
- a controller operative to cause the CRID to be resolved to a content locator or to find metadata associated with the CRID;

said communications interface being operative to transmit an invitation for any physical objects to transmit a CRID.

20. A receiver comprising:
- a communications interface for receiving a Content Reference Identifier (CRID) from a physical object; and
- a controller operative to cause the CRID to be resolved to a content locator or to find metadata associated with the CRID;

said communications interface comprising a wireless communications interface.

21. A receiver comprising:
- a communications interface for receiving a Content Reference Identifier (CRID) from a physical object;
- a controller operative to cause the CRID to be resolved to a content locator or to find metadata associated with the GRID; and
- a bi-directional signaling interface for communicating with a server hosting TV-Anytime data.

22. A personal digital recorder (PDR) incorporating a receiver comprising:
- a communications interface for receiving a Content Reference Identifier (CRID) from a physical object; and
- a controller operable to cause the CRID to be resolved to a content locator or to find metadata associated with the CRID;

said controller being operative to process a plurality of CRIDs received from at least one physical object.

23. A method of processing a content reference identifier (CRID) comprising:
- receiving a CRID from a physical object via a communications interface;
- causing the CRID to be resolved to a content locator or finding metadata associated with the CRID; and
- performing at least one of: (i) causing content corresponding to the resolved CRID to be presented on a presentation device local to the receiver; (ii) scheduling a recording of content corresponding to the resolved CRID on a recording device; (iii) scheduling a reminder to be displayed when content corresponding to the resolved CRID is available.

24. A method according to claim 23 comprising accessing a store of user preferences to determine what action to take upon resolving a CRID.

25. A computer program embodied in a non-transitory computer-readable medium for effecting the performance of a method of processing a content reference identifier (CRID) comprising:
- receiving a CRID from a physical object via a communications interface;
- causing the CRID to be resolved to a content locator or finding metadata associated with the CRID; and
- performing at least one of: (i) causing content corresponding to the resolved CRID to be presented on a presentation device local to the receiver; (ii) scheduling a recording of content corresponding to the resolved CRID on a recording device; (iii) scheduling a reminder to be displayed when content corresponding to the resolved CRID is available.

* * * * *